3 Sheets—Sheet 1.

E. GRAY.

PRINTING-TELEGRAPH INSTRUMENT.

No. 6,870. Reissued Jan. 25, 1876.

Witnesses:
Heinrich L. Bruns.
S. H. Bunting

Elisha Gray,
Inventor.
By Coburn & Thacher
Attys.

THE NORRIS PETERS CO., PHOTO-LITHO., WASHINGTON, D. C.

E. GRAY.

PRINTING-TELEGRAPH INSTRUMENT.

No. 6,870. Reissued Jan. 25, 1876.

Witnesses:
Heinrich L. Bruns.
L. A. Bunting

Elisha Gray,
Inventor.
By Coburn & Thacher
Attys.

THE NORRIS PETERS CO., PHOTO-LITHO., WASHINGTON, D. C.

3 Sheets—Sheet 3.
E. GRAY.
PRINTING-TELEGRAPH INSTRUMENT.
No. 6,870.
Reissued Jan. 25, 1876.
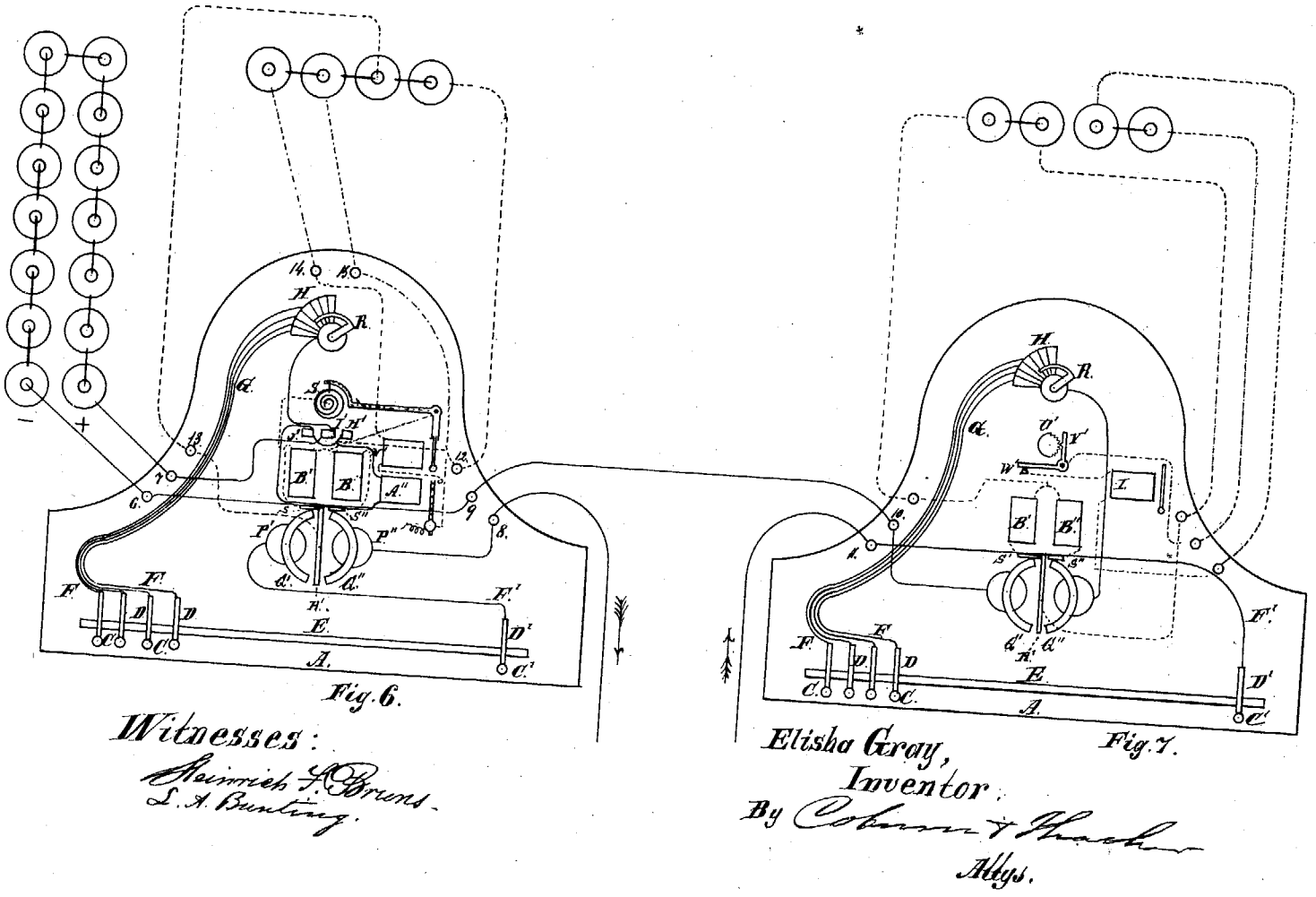
THE MORRIS PETERS CO., PHOTO-LITHO., WASHINGTON, D. C.

UNITED STATES PATENT OFFICE.

ELISHA GRAY, OF CHICAGO, ILLINOIS.

IMPROVEMENT IN PRINTING-TELEGRAPH INSTRUMENTS.

Specification forming part of Letters Patent No. 132,907, dated November 12, 1872; reissue No. 6,870, dated January 25, 1876; application filed December 2, 1875.

DIVISION A.

*To all whom it may concern:*

Be it known that I, ELISHA GRAY, of Chicago, in the county of Cook and State of Illinois, have invented certain new and useful Improvements in Printing-Telegraph Instruments, which are fully described in the following specification, reference being had to the accompanying drawings, in which—

Figure 1:
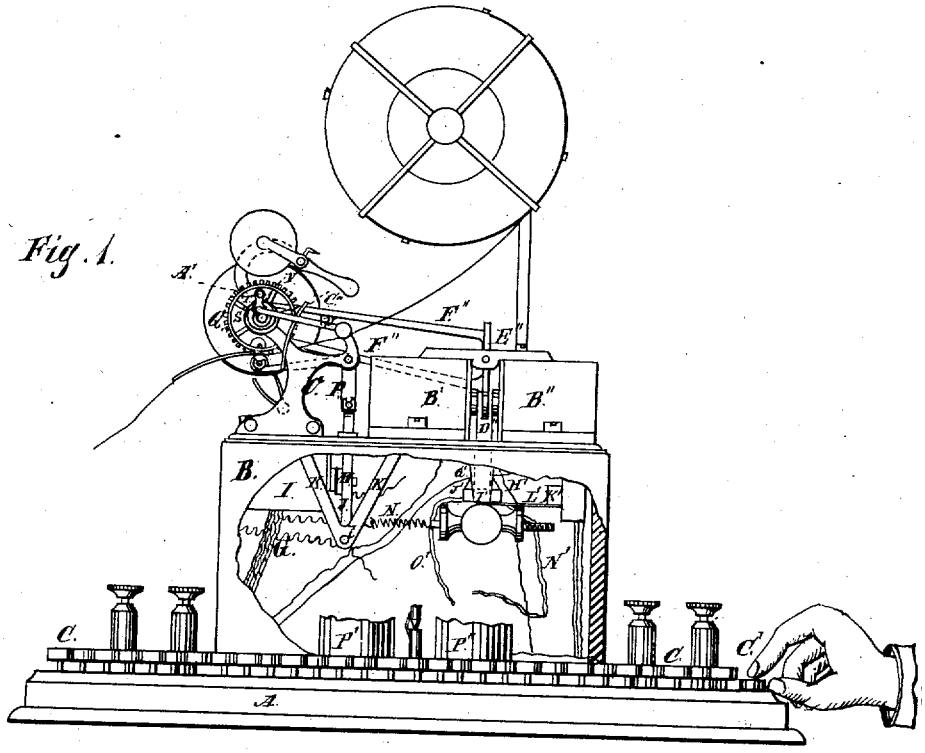
Figure 3:
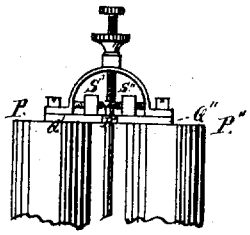
Figure 2:
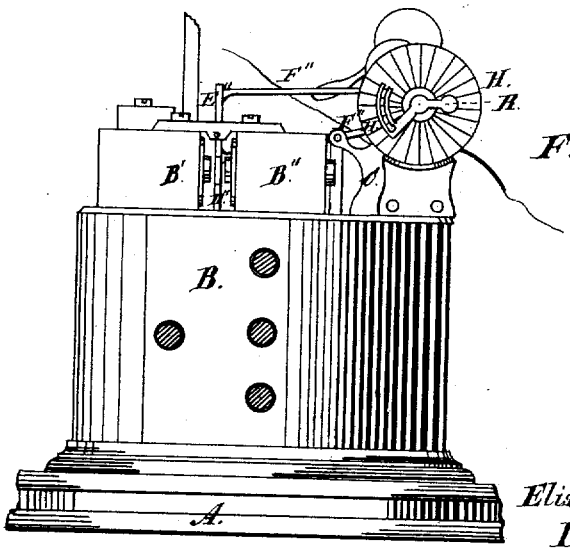
Figure 4:
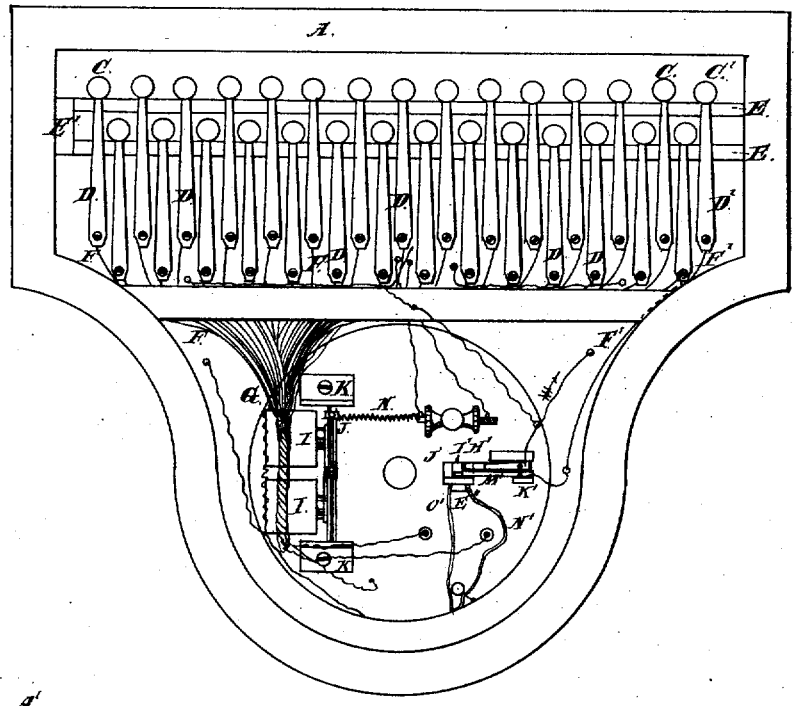
Figure 5:
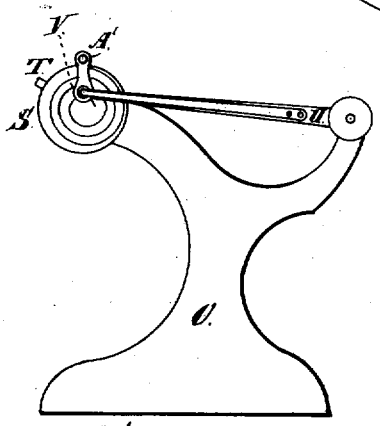

Figure 1, Sheet 1, represents a front elevation of a printing-telegraph instrument provided with my improvements, the upper part of the polarized relay and cylindrical case being broken away for the purpose of exhibiting the parts within the case. Fig. 2, Sheet 1, is a rear elevation of the same. Fig. 3, Sheet 1, is a front elevation of the upper part of the polarized relay, detached. Fig. 4, Sheet 2, is a bottom view of my improved instrument. Fig. 5, Sheet 2, is an enlarged view of the unison-stop, detached. Figs. 6 and 7, Sheet 3, represent a plan view or chart, more fully showing the connection between the different parts of the instrument, the relation of the instrument to the batteries, and of the primary to the secondary instruments along the line.

The object of my invention is to provide a line of printing-telegraph instruments, consisting of one primary and one or more secondary instruments, charged, alternately, with positive and negative currents by a single main battery and a pole-changer, thus dispensing with the use of a switch, and also of a main battery and a pole-changer, except at the stations where the primary instrument is located, the said pole-changer being under the control of the operator at any station on the line, and the instruments being automatic in action, with the exception of the ordinary manipulation of keys at the transmitting-station.

The invention herein claimed relates to a pole-changer, so constructed and arranged that with one main battery the printing instruments throughout the line may be charged, alternately, with positive and negative currents; also, to the combination of a pole-changer with with a type-wheel, in such a manner that both will be controlled by the same armature; and, also, in certain combinations of a pole-changer with other devices, for the accomplishment of certain specific results, as will be hereinafter fully set forth.

The case of the instruments consists of two parts—a base, A, and an upright portion, B, the latter being surmounted by a suitable brass cover.

C C′ are keys, the former of which are designated by the letters of the alphabet and marks of punctuation. All are constructed with gutta-percha heads, having brass pins extending freely through the case.

D D′ are metallic platinum-pointed springs, supporting the lower end of the pins projecting from the keys, and E E are metallic strips faced with platinum-foil, and united by the cross-piece E′, against which strips the movable ends of the springs D D′ rest.

F F′ are small insulated copper wires, each of which communicates with one of the keys C C′, and all of which, excepting F′, unite and form the cable G, and then, separating, each wire of the cable communicates with one of the metallic pieces H, all of which pieces are attached to a disk, but are insulated from each other and from the disk to which they are attached, and constitute what is known as a "sunflower," while the sunflower, spring-drag, wires F F′, and corresponding keys constitute what I call a sunflower system.

I is an electro-magnet, wound with insulated copper wire, (preferably No. 23.) J is a lever, and K is a bracket to which it is pivoted, as shown at *l*, Fig. 1.

M is a soft-iron armature, rigidly attached to an arm or lever projecting from the shoulder or pivot of the lever J, and N is a coil-spring, by which the lever J is drawn back when the circuit through the magnet I is open.

When the circuit through the magnet I is closed the armature M is drawn to the poles of the said magnet, and the lever J vibrated as this circuit is opened and closed.

O is a frame, and P is the press-lever pivoted thereto, to which lever the printing-pad or roller and the feeding mechanism are attached. The lever P is jointed to the lever J in such a manner that the vibration of the latter operates the feeding mechanism and throws the pad against the type-wheel. Q is the type-wheel, rigidly attached to a shaft having bearings in the frame O.

R is a German-silver spring-drag, rigidly attached to one end of the type-wheel shaft, and having its free end resting on one of the pieces H. For certainty of operation, this spring is split and bent in the manner shown.

S, Fig. 5, is a disk rigidly attached to the type-wheel shaft, but adjustable thereon. The outer face of this disk is spirally grooved. T is a platinum pin, rigidly attached to and projecting slightly above the periphery of the disk S. U is an arm pivoted to the frame O, and extending to the central part of the disk S. The free end of this arm is perforated, and V is a headed steel pin passing freely through the said perforation, and projecting into the spiral groove on the disk S.

A platinum pin, A′, is supported by the arm U, but is insulated therefrom, and so arranged with reference to the disk S that when the latter is rotated the pin T will be brought into contact with the pin A′. A small insulated copper wire (not shown) connects the pin A′ with the inside wire of the magnet B′, hereafter mentioned.

A forked arm, C″, is attached to the horizontal arm of the lever P, and, extending upward, its forked portion embraces the arm U, so that the upward movement of the arm of lever P will cause the pin A′ to be lifted above the pin T, and thereby break its contact therewith. To accommodate this movement, the point of the pin V is slightly rounded, and the spiral groove in which it travels is slightly wedge-shaped, so that the pin V will yield sufficiently for the purpose.

D″ is a soft-iron armature located between the magnets B′ B″, and E″ is a pivoted lever to which the armature is attached. From the lever E″ converging arms F″ F″ extend and terminate in verges for wedge-shaped projections, which alternately rest in V-shaped notches sunk into the periphery of a disk (not shown) rigidly attached to the type-wheel shaft, so that the type-wheel will be intermittently revolved by the vibrations of the lever E″ and one letter at a time presented to the paper on which the messages are printed.

B′ B″ are ordinary electro-magnets, the poles of which are arranged opposite the sides of the armature D″.

The pole-changer is constructed as follows: G is an insulator-block attached to the lower end of the lever E″. H′ I′ J′ are metallic blocks attached to the block G′, so as to be insulated from each other.

K′ is also an insulator-block, and L′ M′ are German-silver springs attached thereto, so as to be insulated from each other.

The free end of the spring L′ rests alternately on the blocks H′ and I′, and the spring M′ alternately on the blocks I′ and J′, as the lever E″ vibrates.

N′ is a common wire communicating with the block H′ J′, and with one pole of the main battery.

O′ is a wire attached to the block I′ and communicating with the other pole of the main battery.

The spring M′ communicates with the keyboard, polarized relay, and the ground, and the spring L′ with the main line.

P′ P″, Fig. 3, represent the polarized relay-magnet, the lower part of which is shown in Fig. 1, which may be its position on the instrument.

Q′ Q″ are semicircular pieces of soft iron attached to the poles of the relay-magnet, and arranged with reference to each other, as shown in Sheet 3, thus dividing the magnetism and making a double or forked pole.

R′ is a hardened and permanently-magnetized steel tongue or armature, pivoted so as to vibrate between the end of the pieces Q′ Q″.

S′ S″ are platinum-pointed screws, and T′ is a post projecting from the armature R and provided with platinum-points so arranged as to alternately come in contact with the points of the screws S′ S″ as the armature R is vibrated.

Having thus described the mechanical construction and operation of my improved devices, and the parts operating in connection therewith, I will now trace the electrical currents through the instrument and describe its operation thereon, and the operation of two or more instruments acting together; and, first, the direction of the main current when the machines are at rest.

In Figs. 6 and 7, Sheet 3, the main circuits are represented by full lines, the type-wheel locals by dotted lines, and the printing-locals by broken lines.

Beginning at the primary instrument, or station No. 1, the plus (+) pole of the main battery enters the instrument at binding-post No. 7; from thence it proceeds through a wire directly to the piece I′ of the automatic pole-changer; thence through spring M′ and its wire to the type-wheel shaft; thence through the spring R to that one of the pieces H in contact therewith, and through its wire to a key corresponding to such piece H; thence to the strips E E, and through key C′ and the polarized relay, and from thence out at binding-post No. 8 to the ground.

At instrument or station No. 2 the plus (+) current passes up the ground-wire to binding-post No. 11; thence to key C′; thence through strips E; thence through one of the keys C and its wire to a corresponding piece, H; thence through the spring R, type-wheel shaft, and its wire to the polarized relay; thence to binding-post No. 10, and over the line to station No. 1, entering the instrument there at binding-post No. 9; from thence it passes through a wire to spring L′ of the pole-changer; from thence through the block J′, which is connected by a wire to the block H′, and through a wire to a Morse relay, which may be attached to the case A, through the said Morse relay and a wire to binding-post No. 6; and from thence to the negative or — pole of the main battery.

The circuit of the type-wheel local battery of instrument No. 1, Fig. 6, is as follows: Entering at binding-screw No. 12, it runs to the local magnets B′ B″, where it branches and connects with the inner end of the coil of each of said magnets. The outer ends of said coils connect, respectively, with the platinum-pointed screws S′ S″. From one or the other of these screws the current passes to the armature R′, according to the screw in contact therewith; from thence it passes to binding-screw No. 13; from thence to the type-wheel local battery.

The printing-circuit enters binding-post No. 15, and passes on a wire directly to the armature-lever of the Morse relay. When this armature-lever is resting on its back point it connects with one end of the wire on the local printing-magnet I, so that when the Morse relay-circuit is open the printing-local circuit is through the said magnet I; from thence it passes to binding-screw No. 14, and to the printing-local battery.

The local magnet B′ B″ is shunted when the pins T and A′ are in contact, as may be observed by tracing the broken lines on Sheet 3, relating to instrument No. 1.

The secondary instrument at station No. 2, Fig. 7, is in all respects like instrument No. 1, except that the former has no pole-changer nor Morse relay, and the printing-local is brought into action in a different manner from that described.

The disk corresponding to the disk S is also differently grooved, and the pins corresponding to the pins T and A′ have no electrical contact.

U′, in instrument No. 2, Sheet 3, is a toothed wheel on the front end of the type-wheel shaft. V′ is a rectangular lever pivoted at its angle, and its upper end is provided with a wedge-shaped point corresponding to the teeth or notches on the wheel U′, with which it engages. W′ is a point in communication with the printing-local battery, and the lower end of the lever V′ rests on the point W′ when the upper end rests in the said notches.

The revolution of the wheel U′ vibrates the lever V′ and breaks its contact with the point W′ and breaks the local printing-circuit, and the vibration is so rapid that the point W′ is not in contact with the lever long enough to close the printing-local circuit until the type-wheel stops for a moment, when the said circuit closes and a letter is printed.

When the line is not in operation the circuits run in the manner described, with the exception of the local type-wheel circuit at instrument No. 1.

The purpose of the contact of the pins T and A′ is to allow the circuit to pass around the magnet B′. As the resistance of the circuit through the shunt is greatly less than through the magnet, it follows that there is little or no magnetism developed in magnet B′, and, as the main circuit is running through the polarized relay-magnet in such a direction as to hold its tongue against the platinum point S′, there is no magnetism in either B′ or B″.

Suppose the operator at instrument No. 1 wishes to communicate with a distant station, he depresses key C′, and thereby breaks the main circuit. By breaking this circuit the Morse relay-magnet at instrument No. 1 is allowed to open, and it will, in turn, on its back stroke, close the printing-local and throw the printing roller or pad and the paper thereon against the type-wheel, so as to make an impression of the letter then presented. At the same time the arm U will be thrown up, and the pin V will rest on the periphery of the disk S. This operation will take the shunt from the magnet B′, and the type-wheel local current acts on the said magnet, so that the armature D″ is drawn to it. This changes the relative position of the pole-changer blocks and the springs resting thereon, and as soon as the key C′ is released the current of the main battery through the polarized relays and over the whole line is reversed.

The armatures of the polarized relays are now thrown against the opposite S″, and the local circuits through the magnets B″ in all the instruments are thus closed, and the armatures D″ are immediately drawn to them. This again reverses the main circuit, and the reverse action takes place.

If the arm U should remain up, the instrument would continue to operate so long as the batteries developed sufficient force. But the pin V follows the spiral groove in the disk S until the type-wheel instrument No. 1 has made three revolutions, when the pins T and A′ are brought in contact.

The last stroke of the armature D″, which brought the pins T and A′ in contact, left the springs L′ and M′ resting on the blocks I′ and J′, and the armature R′ is thrown against the point S′, which creates the usual action on all the type-wheel locals, except that of instrument No. 1. Magnet B′ being shunted by the contact of the points T and A′, the contact of the armature R′ with the point S′ produces no effect on the said magnet; consequently the armatures, both local and main, cease to act.

As all the machines in the circuit are controlled by instrument No. 1, they all stop at the same time and on the same letter. The points T and A′ on all the instruments, except No. 1, engage with each other at two revolutions of the type-wheel, instead of three, and make no electrical contact, but simply lock the type-wheel when the proper letter is presented, and until the type-wheel of instrument No. 1 makes another revolution and stops at the same letter.

By this means all the type-wheels, if they should be disarranged, are brought into unison, so as to act together. If the operator at either instrument now depresses key C′ the printing-local of instrument No. 1 will be closed and the shunt taken from magnet B′.

In order to print a word or sentence the operator, before releasing the key C′, depresses the key designated by the first letter of the word or sentence, and at the same time releases the key C′. The armature will now vibrate rapidly and carry forward the type-wheels until they reach the letter corresponding to the key which is still depressed.

When the point of the spring R, which moves with the type-wheel, reaches the piece H, corresponding to the depressed key, it finds the main circuit open at that key; consequently, the vibration of the armatures R′ ceases, and the type-wheel stops, its movement depending upon the vibration of said armature.

A letter on the type-wheel is now over the printing-pad. All the printing-locals are now brought into action—that of instrument No. 1 because the armature of the Morse relay (A″, Sheet 3, instrument No. 1) falls on its back point on account of the main circuit being open; that of instrument No. 2 because the type-wheel has stopped and allowed the lever V′ to rest on the point W′.

He now finds the key corresponding to the next letter to be printed, depresses this key, and releases the key corresponding to the first letter, and so continues until the message is printed.

After he has released the last key operated upon, the type-wheel of instrument No. 1, makes three revolutions, and the line is then at rest.

It may be here stated, that as it requires three uninterrupted revolutions of the type-wheel to bring the shunting-points T and A′ in contact, and as a letter is printed at least as often as once in each revolution, the said points cannot come in contact during the operation of printing.

I make no claim to many parts of the mechanism which I have shown and described in order to explain the construction and operation of the instruments; and the specific construction of several of the devices which I claim to have combined in a novel manner is not of my invention.

Having thus described my invention, what I claim, and desire to secure by Letters Patent, is—

1. A line of telegraph-printing instruments, charged alternately with positive and negative currents by one main battery and pole-changer placed at any point on the line, substantially as described.

2. A line of telegraph-printing instruments, charged alternately with positive and negative currents by one main battery and pole-changer, placed at any point in the line, and operated by means of circuits and electro-mechanical devices, substantially as described.

3. A line of telegraph-printing instruments, consisting of one primary and one or more secondary instruments, the former controlling the action of the latter, substantially as and for the purpose described.

4. The combination, substantially as described, of a pole-changer and a type-wheel, both controlled by the same armature.

5. The combination, substantially as described, of a pole-changer, a type-wheel, and a polarized relay, for the purposes set forth.

6. An electro-mechanical pole-changer, consisting of the blocks H′ I′ J′ and insulated springs L′ and M′, arranged and operating substantially as described.

7. The combination, substantially as described, of a polarized relay and the pole-changing magnets B′ B″, as and for the purposes set forth.

ELISHA GRAY.

In presence of—
HEINRICH F. BRUNS,
L. A. BUNTING.